US008378597B2

(12) United States Patent
Shek

(10) Patent No.: US 8,378,597 B2
(45) Date of Patent: Feb. 19, 2013

(54) INDUCTION ACTIVATED COVER ASSEMBLY FOR CONTAINER

(76) Inventor: Michael Shek, San Mateo, CA (US)

( * ) Notice: Subject to any disclaimer, the term of this patent is extended or adjusted under 35 U.S.C. 154(b) by 540 days.

(21) Appl. No.: 12/639,953

(22) Filed: Dec. 16, 2009

(65) Prior Publication Data

US 2010/0089920 A1 Apr. 15, 2010

Related U.S. Application Data

(63) Continuation-in-part of application No. 11/790,917, filed on Apr. 30, 2007, now abandoned.

(51) Int. Cl.
*H02K 7/14* (2006.01)

(52) U.S. Cl. ........................................... 318/3; 220/211

(58) Field of Classification Search ....... 318/3; 220/211
See application file for complete search history.

(56) References Cited

U.S. PATENT DOCUMENTS 2,739,730 A * 3/1956 Irving ........................... 220/350
3,645,417 A * 2/1972 Leal ........................... 220/345.1
4,428,491 A * 1/1984 Mittelmann et al. ........... 220/1.5
4,929,862 A * 5/1990 Hamilton et al. .......... 312/138.1
5,275,064 A * 1/1994 Hobbs ............................ 74/110
6,508,525 B2 * 1/2003 Picogna ......................... 312/196
6,719,344 B2 * 4/2004 Ono et al. .................. 296/24.34
6,752,476 B2 * 6/2004 Lin .............................. 312/290
6,774,586 B1 * 8/2004 Shih .................................. 318/9
6,812,655 B1 * 11/2004 Wang et al. ........................ 318/3
2007/0266637 A1 * 11/2007 McGowan ....................... 49/349
2008/0237234 A1 * 10/2008 Yang et al. .................... 220/263
2008/0264942 A1 * 10/2008 Shek ............................. 220/211

* cited by examiner

*Primary Examiner* — Kawing Chan

(57) ABSTRACT

A cover assembly of a container includes a first part and a second part mounted on an open top of the container, the first part includes an opening and the second part includes a through hole which is located corresponding to the opening. The second part including two sidewalls and each sidewall has a plurality of guide slots such that a plurality of plates are respectively and slidably engaged with the guide slots between the two sidewalls to open the through hole or to close the through hole. A driving unit is located on the second part and driving the plates to move along the guide slots. An induction unit is connected to a front end of the first part and includes an induction member which activates the driving unit.

8 Claims, 7 Drawing Sheets

INDUCTION ACTIVATED COVER ASSEMBLY FOR CONTAINER

BACKGROUND OF THE INVENTION

Field of the Invention

The application is a Continuation-In-Part of prior application Ser. No. 11/790,917, filed Apr. 30, 2007, now abandoned the entire contents of which are hereby incorporated by reference.

DESCRIPTION OF THE PRIOR ART

A conventional induction activated cover of a container is disclosed in U.S. Pat. No. 6,812,655 and the cover is pivotably connected to the container body. A motor, a gear set and a battery are received in the space in the bottom of the container body, and a driving shaft is connected to the gear set and is connected to the cover. The cover is pivoted upward to open the container body when the motor is activated. It is obvious that the cover needs a lot of space to be pivoted to the opened position. However, if the container is used as a trashcan and put under a table, there is limited space between the cover and the top of the table, so that when the cover is inducted to open, the cover touches the top of the table before the cover is pivoted to the opened position. Furthermore, the speed of the opening of the cover is too slow because the motor an the gear set are located at a distance from the cover, the transmission force has to transfer to the cover through the driving shaft which is as long as the height of the container body.

U.S. Pat. No. 6,752,476 also discloses a similar structure. However, '476 discloses a plurality of combination rods (51) is driven downward along the guiding slot (42). As such, each of the rods (51) is not slidable with respect to its adjacent rods, and they cannot be piled up when opening the door (50). As a result, the structure of '476 takes more space to store the combination rods (51) as the door (50) is open, and thus a guiding slot (42) is indispensably disposed on the rear side of the container body (20). That is to say, the moving door module (40) is inseparable from the container body (20).

The present invention intends to provide an induction activated cover assembly for a container such as a trashcan and the driving unit and the cover are located at the top of the trashcan, and the cover is composed of multiple plates which are moved linearly to open and close the trashcan.

SUMMARY OF THE INVENTION

The present invention relates to a cover assembly of a container and comprises a first part and a second part which is mounted on an open top of the container. The first part has an opening which is located corresponding to a through hole of the second part. The second part includes two sidewalls and a front wall connected between the two sidewalls. Each sidewall has a plurality of guide slots defined in an inside thereof and a plurality of plates are respectively and slidably engaged with the guide slots between the two sidewalls. Each plate is slidable with respect to its adjacent plate(s). A driving unit is located on the second part and drives the plates to move along the guide slots. An induction unit is connected to a front end of the first part and includes an induction member which activates the driving unit.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
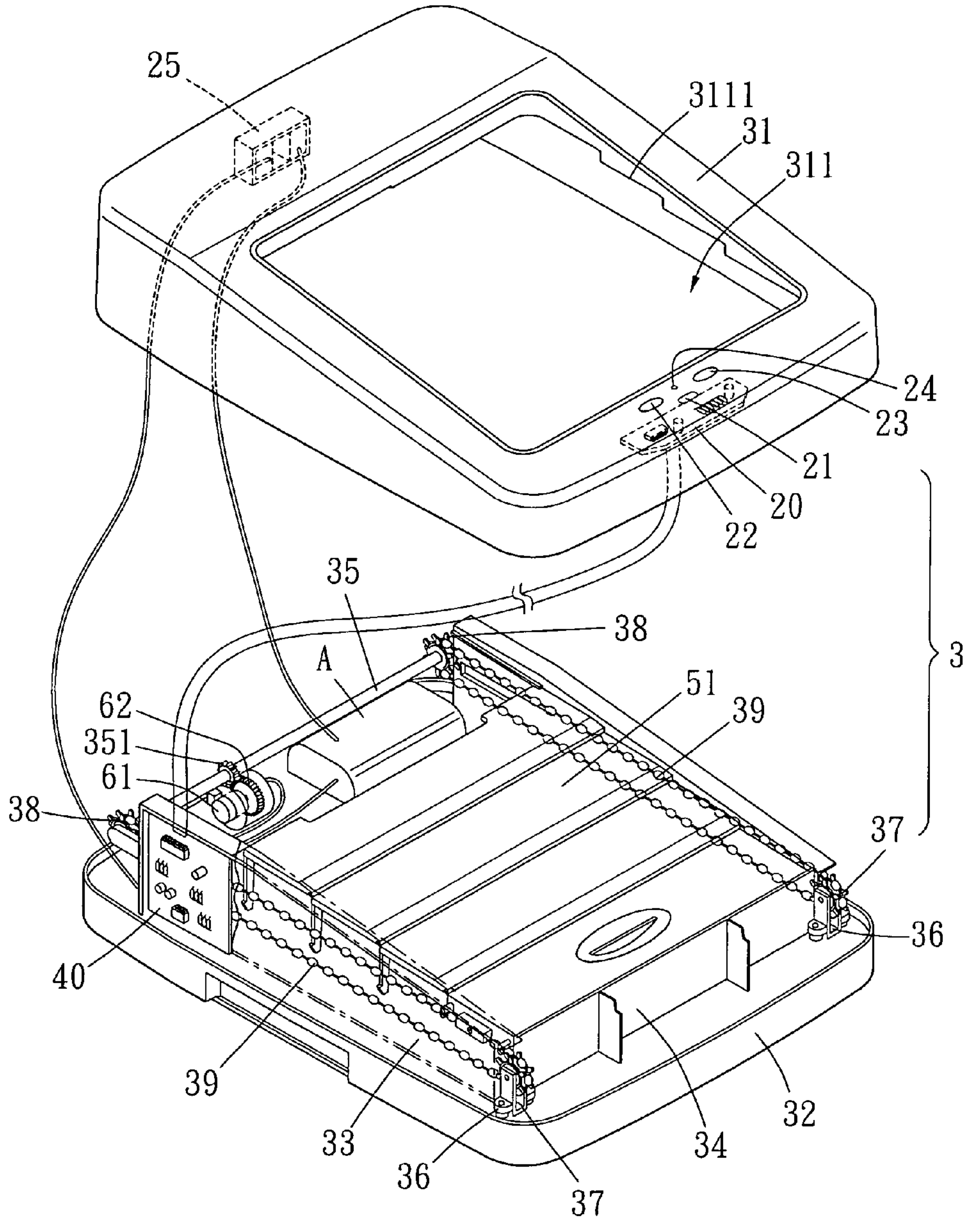
FIG. 1 is an exploded view to show the cover assembly of the present invention.
Figure 2:
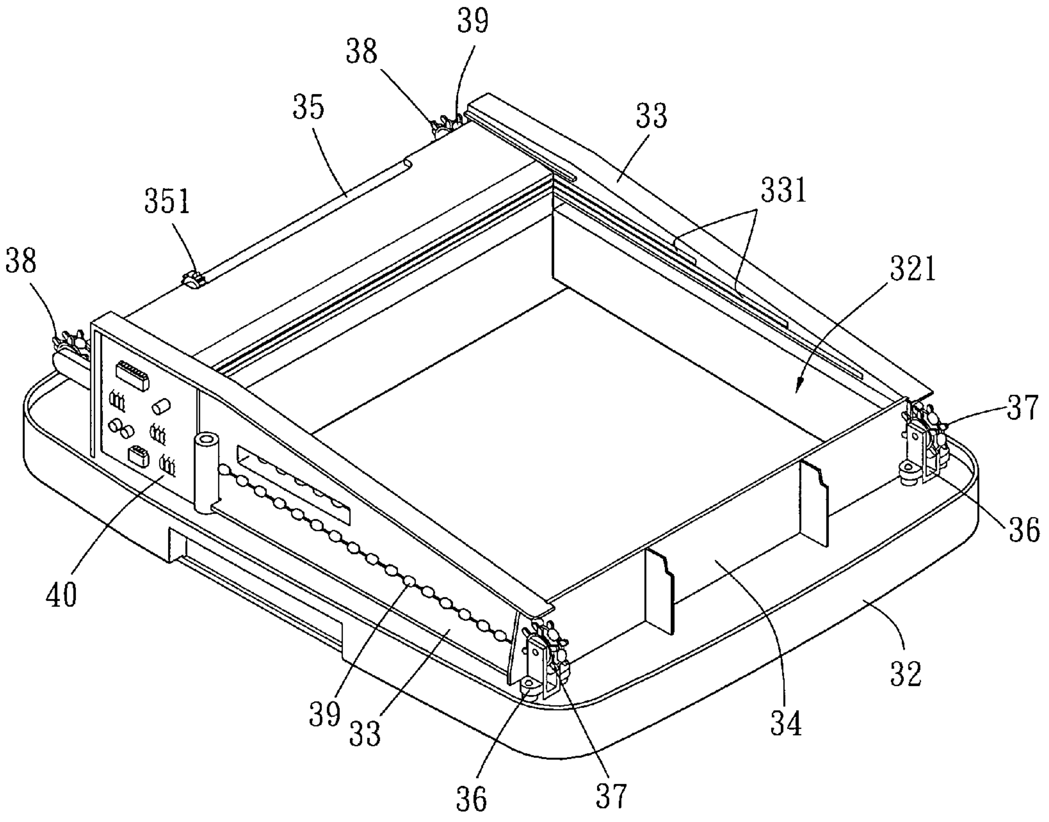
FIG. 2 is a perspective view to show the second part of the cover assembly of the present invention.

Referring to FIGS. 1 and 2, the cover assembly 3 of a container such as a trashcan of the present invention comprises a first part 31 and a second part 32 which is mounted on an open top of the container. The first part 31 includes an opening 311 a plurality of stepped edges 3111 are defined in two insides of the opening 311 of the first part 31. An induction unit 20 is connected to a front end of the first part 31 and includes an induction member 21 which activates the driving unit connected to the second part 32. The induction unit 20 includes a manual "ON" switch 22 and a manual "OFF" switch 23, an indication light 24 is located between the manual "ON" switch 22 and the manual "OFF" switch 23.

The second part 32 has a through hole 321 which is located corresponding to the opening 311. The second part 32 includes two sidewalls 33 and a front wall 34 is connected between the two sidewalls 33. Each sidewall 33 has a plurality of guide slots 331 defined in an inside thereof and a plurality of plates 51 are respectively and slidably engaged with the guide slots 331 between the two sidewalls 33. A top of two ends of each of the plates 51 is slidably in contact with the stepped edges 3111.

The driving unit is located on the second part 32 and is able to drive the plates 51 to move along the guide slots 331. Two front wheels 37 are located on two respective front ends of the two sidewalls 33 by two U-shaped frames 36 and two rear wheels 38 are located on two respective rear ends of the two sidewalls 33 by two U-shaped frames 36. Two respective transmission members 39 are respectively driven by the front and rear wheels 37, 38. One of the plates 51 is driven by the transmission members 39. A shaft 35 is located at a rear end of the second part 32 and connected between the two rear wheels 38. The driving unit further includes a motor 61 and a gear set 62 driven by the motor 61. The shaft 35 includes a gear 351 mounted thereto which is engaged with the gear set 62. A power supply "A" is connected to the second part 32 and electrically connected to the control unit 4 and the motor 61. A switch 25 is connected to the rear end of the firs part 31. A control unit 40 is connected one of the two sidewalls 33 and electrically connected with the induction unit 20, the switch 25 and the power supply "A" The power supply "A" can be a battery and a cover "B" is used to position the battery.

Figure 3:
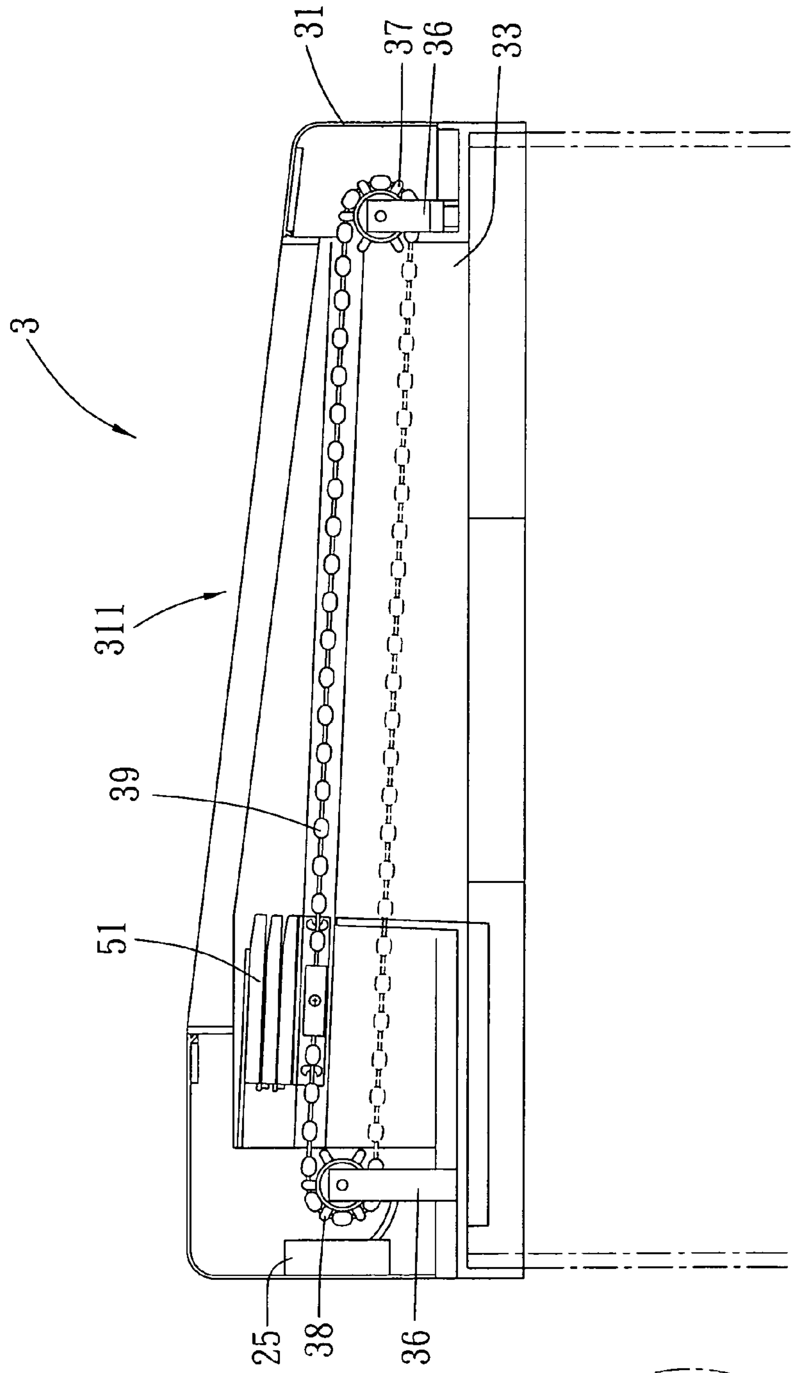
FIG. 3 is a side view to show the cover assembly of the present invention wherein the plates are moved to an end to open the through hole of the second part.
Figure 3A:
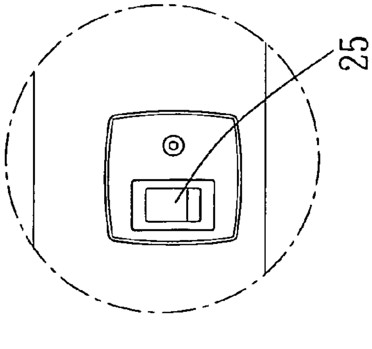
FIG. 3A shows the power supply includes a switch.
Figure 4:
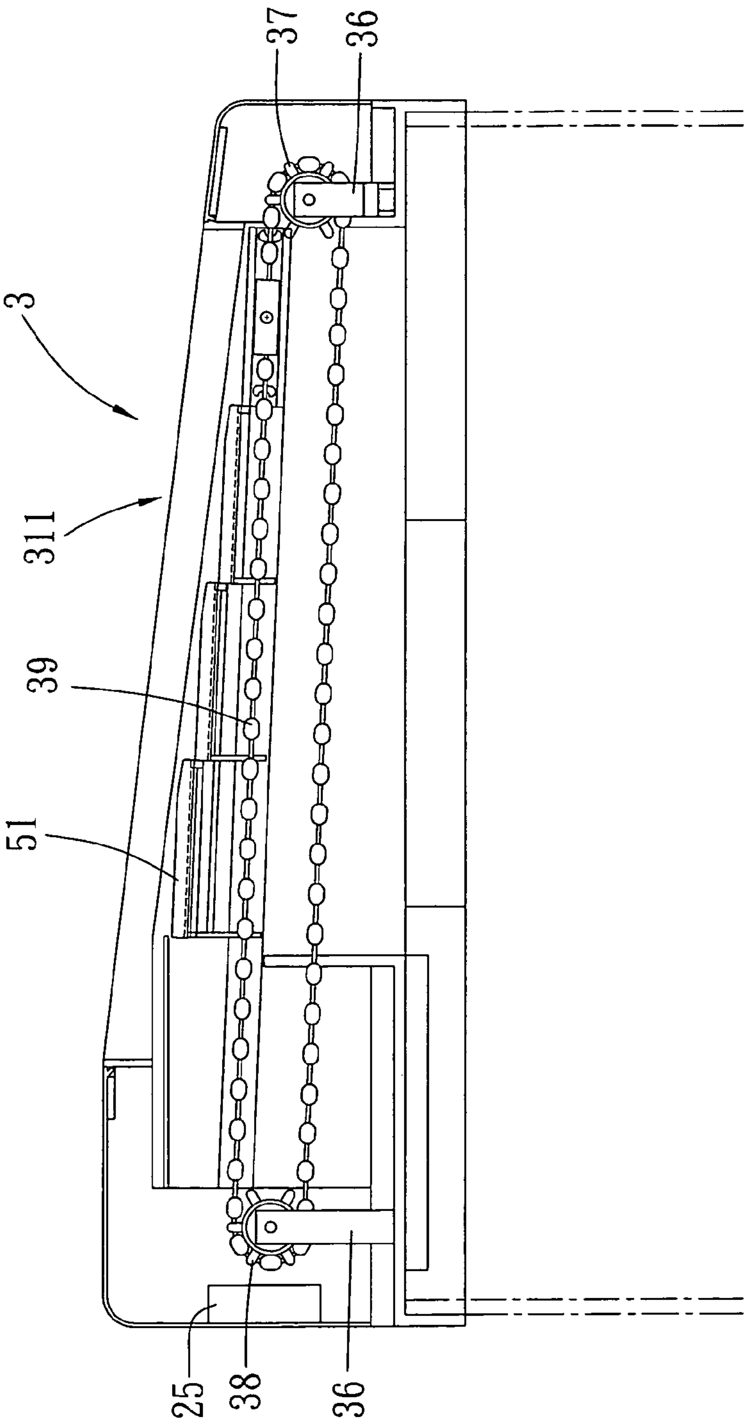
FIG. 4 is a side view to show the cover assembly of the present invention wherein the plates are expanded end to close the through hole of the second part.
Figure 5:
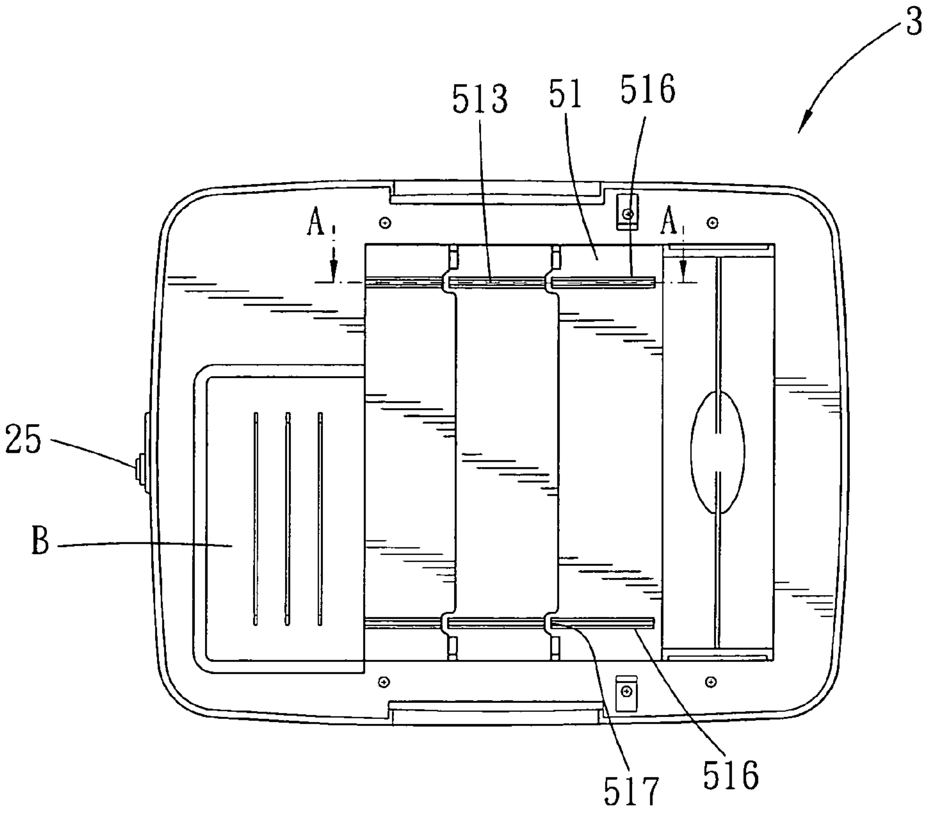
FIG. 5 is a top view to show the cover assembly of the present invention.
Figure 6:
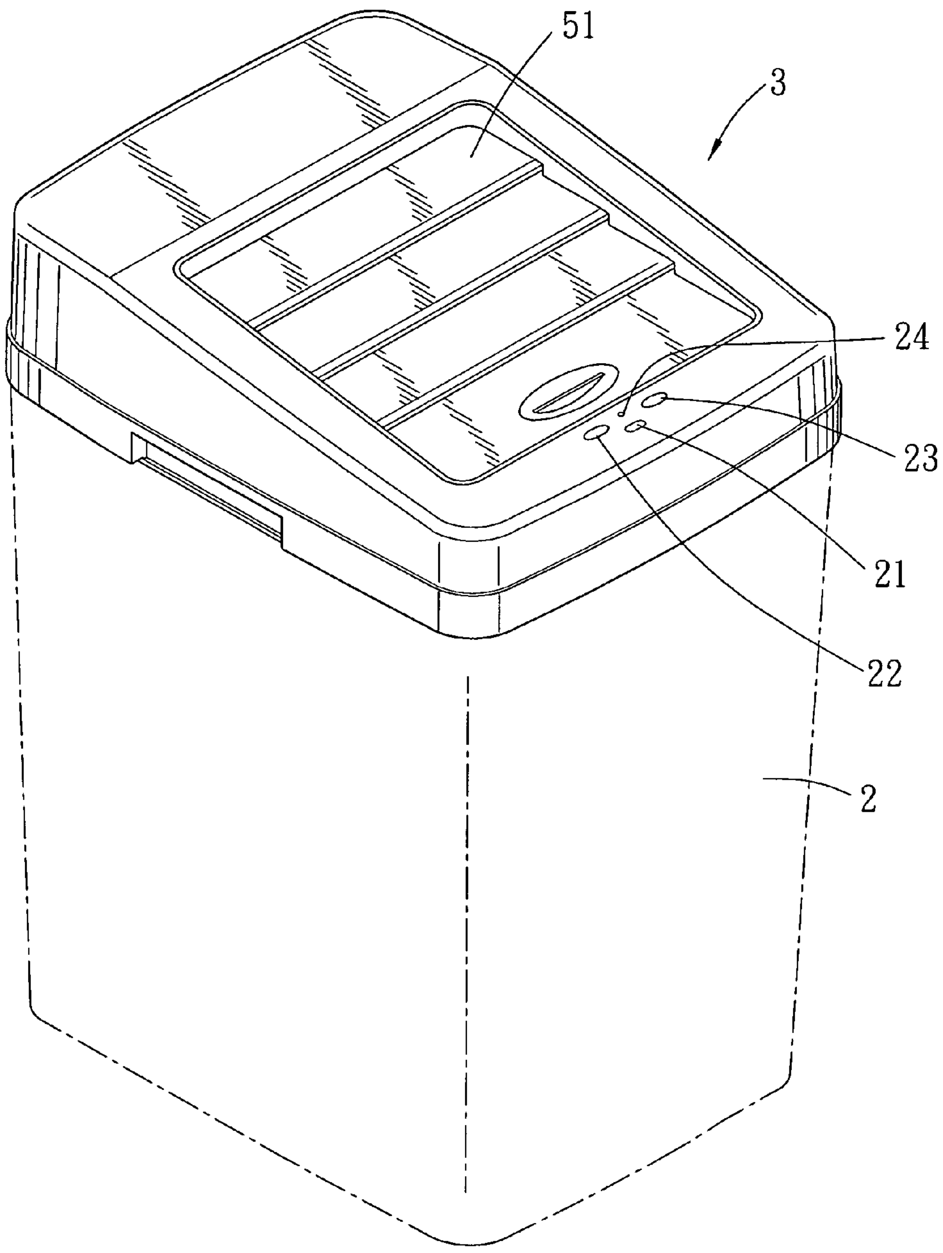
FIG. 6 is a perspective view to show the cover assembly of the trashcan is in closed status of the present invention.
Figure 7:
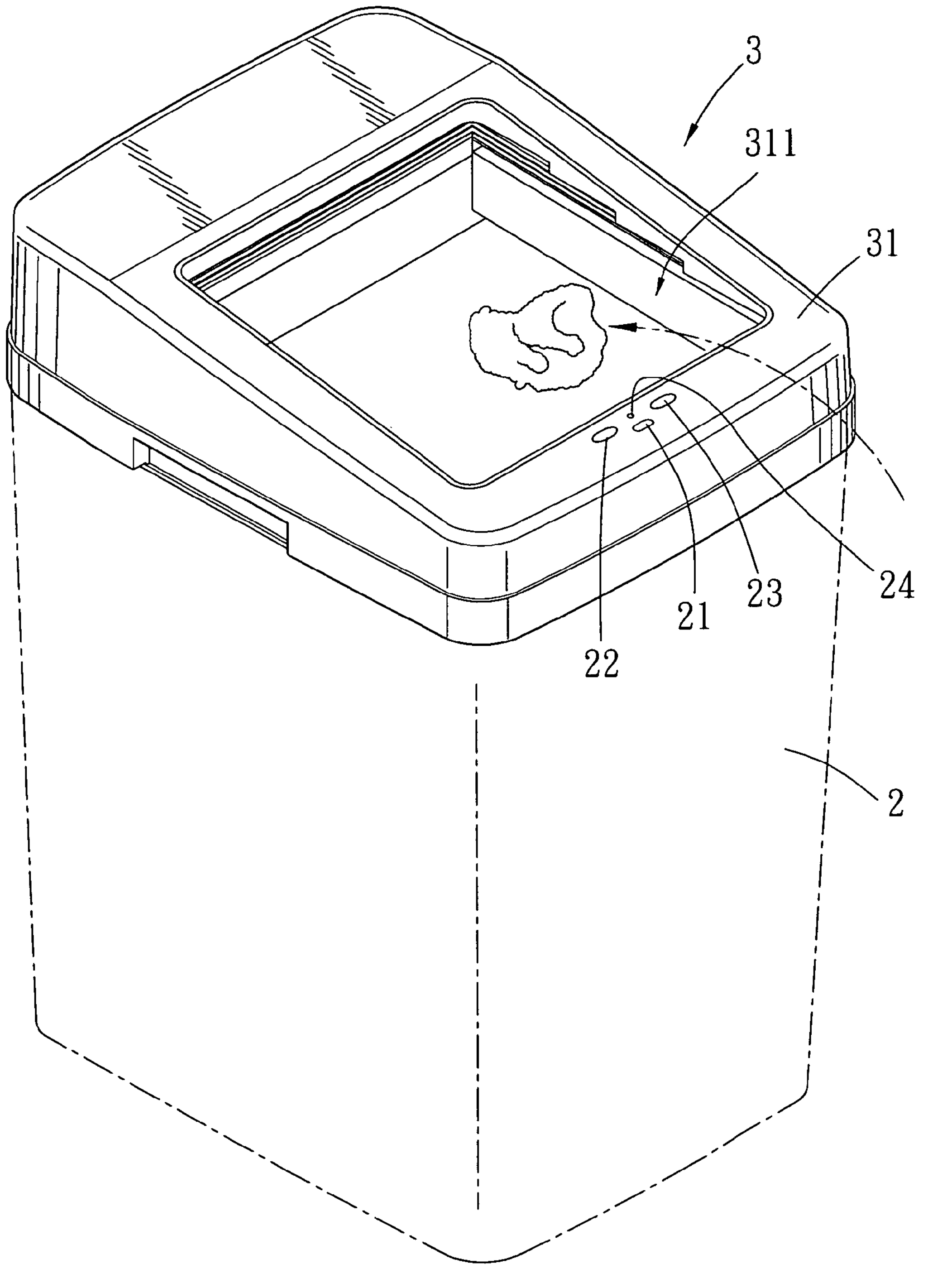
FIG. 7 is a perspective view to show the cover assembly of the trashcan is in opened status of the present invention.

The plates 51 stretch from each other to close the through hole 321 of the second part 32 when the plates 51 are respectively engaged with the guide slots 331 as shown in FIGS. 5 and 6. When the user's hand approaches the induction unit 20, the induction member 21 senses the hand and sends a signal to the control unit 40 which activates the motor 61 to rotate the shaft 35 and the leading plate 51 is pulled toward the rear end of the second part 32 so that the rest of the plates 51 are pushed to the closed position and all the plates are eventually piled up as shown in FIGS. 3 and 7. The plates 51 move quickly so that the user does not need to wait to through the garbage into the container 2 (trashcan).

Figure 5A:
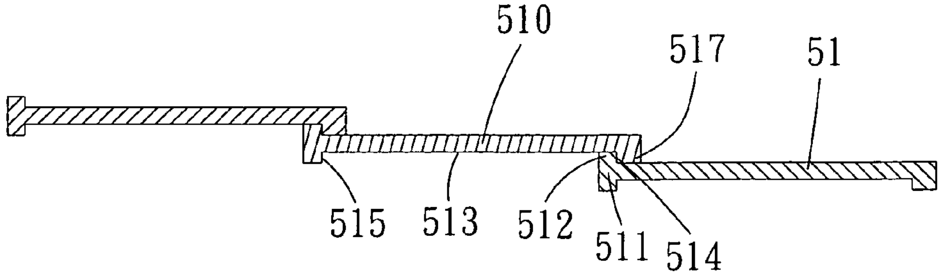
FIG. 5A is an AA profile of FIG. 5.
Figure 5B:
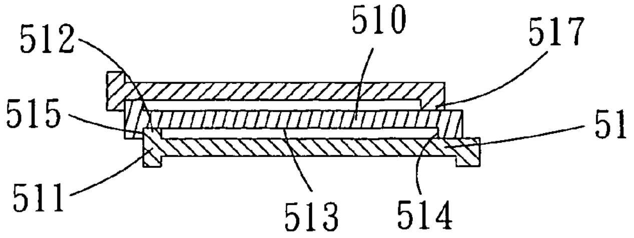
FIG. 5B is a profile showing the plates of the present invention being piled up.

More specifically, each of the plates 51 has a rear portion 511 having a hook portion 512 extending therefrom upward as shown in FIGS. 5, 5A and 5B. Further, each of the plates 51 has a bottom surface having a rail 513. Each rail 513 has a front end 514 and a rear end 515, and the hook portion 512 of a front plate 51' is slidably engaged with the rail 513 of a rear plate 51". Note that the terms "front plate" and "rear plate" is named for descriptive purposes only. That is to say, every two adjacent plates include a "front plate" and a "rear plate", in which the "front plate" indicates the plate at the front side, and the "rear plate" indicates the plate at the rear side. As the front plate 51' moves forward, the front plate 51' slides with respect to the rear plate 51" until the hook portion 512 abuts against the front end 514 of the rail 513, and then the front plate 51' moves forward together with the rear plate 51" until the first and second plates 51' and 51" are stopped by their corresponding guiding slots respectively, as shown in FIGS. 5A and 6. As the front plate 51' moves rearward, the front plate 51' slides with respect to the rear plate 51" until the hook portion 512 abuts against the rear end 515 of the rail 513, and then the front plate 51' moves rearward continuously together with the rear plate 51" until all the plates 51 are eventually piled up, as shown in FIGS. 5B and 7. In other words, each plate is slidable with respect to its adjacent plate(s).

The plates 51 move linearly so that the space between the cover assembly and an underside of the top of a table does not affect the operation of the cover assembly. The cover assembly is an independent combination so that any container 2 can be cooperated with the cover assembly.

Each of the plates 51 has a top surface having two linear first stuck portions (such as linear grooves) 516 which extend in a direction in which the plates 51 slide and are substantially parallel to each other. Each of the plates 51 has a front portion having two second stuck portions 517 disposed on the bottom surface thereof, and the second stuck portions 517 are slidably mounted to and movable along the corresponding first stuck portions 516 respectively so that the plates 51 can move forward and rearward without moving laterally.

It is noted that although U.S. Pat. No. 6,752,476 discloses a plurality of movable rods, the rods cannot slide with respect to their adjacent rod(s). Thus the rods of U.S. Pat. No. 6,752,476 cannot be piled up to safe the space. Besides, U.S. Pat. No. 6,752,476 does not provide any hook portion that is slidable with respect to the rails on its adjacent rod. On the contrary, the rods of U.S. Pat. No. 6,752,476 directly hook with its adjacent rod(s). Thus it is readily obvious that the rods of U.S. Pat. No. 6,752,476 are definitely not movable with respect to each other, and are therefore different from the plates of the present invention.

While we have shown and described the embodiment in accordance with the present invention, it should be clear to those skilled in the art that further embodiments may be made without departing from the scope of the present invention.

What is claimed is:

1. A cover assembly of a container, comprising:

a first part and a second part which is adapted to mount on an open top of the container, the first part having an opening and the second part having a through hole which is located corresponding to the opening, the second part including two sidewalls and a front wall connected between the two sidewalls, each sidewall having a plurality of guide slots defined in an inside thereof and a plurality of plates respectively and slidably engaged with the guide slots between the two sidewalls, each said plate being slidable with respect to its adjacent plate(s); and a driving unit located on the second part and driving the plates to move along the guide slots such that the plates can be selectively piled up to open the through hole, an induction unit connected to a front end of the first part and including an induction member which activates the driving unit, wherein a plurality of stepped edges are defined in two insides of the opening of the first part and a top of two ends of each of the plates are slidably in contact with the stepped edges, each of the plates has a top surface having two linear first stuck portions which extend in a direction in which the plates slide and are substantially parallel to each other, each of the plates has a front portion having two second stuck portions disposed on a bottom surface thereof, and the second stuck portions are slidably mounted to and movable along the corresponding first stuck portions respectively so that the plates move forward and rearward without moving laterally.

2. The cover assembly as claimed in claim 1, wherein two front wheels are located on two respective front ends of the two sidewalls and two rear wheels are located on two respective rear ends of the two sidewalk, two respective transmission members are respectively driven by the front and rear wheels, a shaft is located at a rear end of the second part and connected between the two rear wheels, a control unit is connected to one of the two sidewalls.

3. The cover assembly as claimed in claim 2, wherein the driving unit includes a motor and a gear set driven by the motor, the shaft includes a gear mounted thereto which is engaged with the gear set.

4. The cover assembly as claimed in claim 2, wherein each of the front and rear wheels is installed to a U-shaped frame.

5. The cover assembly as claimed in claim 1, wherein one of the plates is driven by transmission members.

6. The cover assembly as claimed in claim 1, wherein a power supply is connected to the second part and electrically connected to the control unit and the motor.

7. The cover assembly as claimed in claim 1, wherein each of the plates has a rear portion having a hook portion extending therefrom upward, and the bottom surface of each of the plates has a rail, each rail has a front end and a rear end, the hook portion of a front plate is slidably engaged with the rail of a rear plate;

wherein as the front plate moves forward, the front plate slides with respect to the rear plate until the hook portion abuts against the front end of the rail, and then the front plate moves forward continuously together with the rear plate until the front plate and the rear plate are stopped by their corresponding guiding slots respectively;

wherein as the front plates moves rearward, the front plate slides with respect to the rear plate until the hook portion abuts against the rear end of the rail, and then the front plate moves rearward continuously together with the rear plate unit all the plates are eventually piled up.

8. The cover assembly as claimed in claim 1, wherein the induction unit includes a manual "ON" switch and a manual "OFF" switch.

* * * * *